No. 785,121. Patented March 21, 1905.

UNITED STATES PATENT OFFICE.

ROBERT E. SCHMIDT, OF ELBERFELD, GERMANY, ASSIGNOR TO FARBEN-FABRIKEN OF ELBERFELD CO., OF NEW YORK, N. Y., A CORPORATION OF NEW YORK.

GREENISH-BLUE ANTHRAQUINONE DYE.

SPECIFICATION forming part of Letters Patent No. 785,121, dated March 21, 1905.

Application filed December 20, 1904. Serial No. 237,706.

*To all whom it may concern:*

Be it known that I, ROBERT E. SCHMIDT, doctor of philosophy, chemist, residing at Elberfeld, Germany, (assignor to the FARBENFABRIKEN OF ELBERFELD CO., of New York,) have invented a new and useful Improvement in New Anthraquinone Dye; and I hereby declare the following to be a clear and exact description of my invention.

My invention relates to the manufacture of a new dyestuff which can be obtained by treating with formic aldehyde and sulfuric acid the blue dye obtainable by heating 1-3-dibromo-2-amidoanthraquinone with cupric chlorid, nitrobenzene, and sodium acetate and being most probably a hydrazin of the formulas

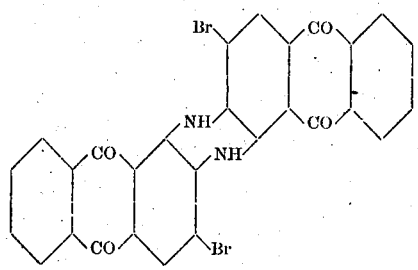

(described in United States Letters Patent No. 775,369, dated November 22, 1904.)

In carrying out my process practically I can proceed as follows, the parts being by weight: Ten parts of the above-mentioned hydrazin, obtainable from 1-3-dibromo-2-amidoanthraquinone, are dissolved in two hundred parts of sulfuric acid, (66° Baumé.) To the resulting solution ten parts of a forty-per-cent. solution of formic aldehyde are slowly added with stirring and taking care that the temperature does not rise higher than 50° centigrade. The mixture is then heated to 70° to 90° centigrade and stirred at this temperature until flakes of a greenish-blue color are obtained on pouring a test portion into water. (The sulfuric-acid solution of the initial material gives reddish-blue flakes on being mixed with water.) When the reaction is thus proved to be complete, the mass is stirred into two thousand parts of water and the precipitate thus obtained is filtered off and washed with water. The new dyestuff is thus obtained in the shape of a greenish-blue paste suitable for dyeing in the "vat." After being dried and pulverized the coloring-matter forms a dark-blue powder. It is more easily soluble in boiling quinolin and with a very marked greener color than the initial material. It is dissolved by concentrated sulfuric acid with a brownish-olive color, greenish-blue flakes being obtained on pouring this solution into water.

Upon treatment with hydrosulfite of sodium in an alkaline solution the new product is transformed into its hydro compound, a greenish-blue vat being thus obtained which dyes cotton greenish-blue pure and fast shades of a greener tint than those obtained with the aid of the initial material.

Having now described my invention and in what manner the same is to be performed, what I claim as new is—

The herein-described new dyestuff which can be prepared by treating with formic aldehyde and sulfuric acid the product obtainable by heating 1.3-dibromo-2-amidoanthraquinone with cupric chlorid, nitrobenzene and sodium acetate, which dyestuff forms after being dried and pulverized a dark-blue powder soluble in concentrated sulfuric acid with a brownish-olive color, being transformed into its hydro compound on suitable reduction with hydrosulfite and caustic-soda lye, the alkaline solution thus obtained exhibiting the typical properties of a "vat" which dyes unmordanted cotton greenish-blue shades, substantially as hereinbefore described.

In testimony whereof I have signed my name in the presence of two subscribing witnesses.

ROBERT E. SCHMIDT

Witnesses:
OTTO KÖNIG,
HEINR. AHLEFELDER.